United States Patent
Gotou

(10) Patent No.: US 9,991,746 B2
(45) Date of Patent: Jun. 5, 2018

(54) VEHICULAR SYSTEM, COMMUNICATION APPARATUS, POWER-FEEDING DEVICE, AND NON-TRANSITORY TANGIBLE COMPUTER-READABLE STORAGE MEDIUM

(71) Applicant: DENSO CORPORATION, Kariya, Aichi-pref. (JP)

(72) Inventor: Toshiyuki Gotou, Nukata-gun (JP)

(73) Assignee: DENSO CORPORATION, Kariya, Aichi-pref. (JP)

(*) Notice: Subject to any disclaimer, the term of this patent is extended or adjusted under 35 U.S.C. 154(b) by 377 days.

(21) Appl. No.: 14/763,368

(22) PCT Filed: Dec. 12, 2013

(86) PCT No.: PCT/JP2013/007305
§ 371 (c)(1),
(2) Date: Jul. 24, 2015

(87) PCT Pub. No.: WO2014/118853
PCT Pub. Date: Aug. 7, 2014

(65) Prior Publication Data
US 2015/0357830 A1  Dec. 10, 2015

(30) Foreign Application Priority Data

Jan. 31, 2013  (JP) ................. 2013-017077

(51) Int. Cl.
*H02J 50/12* (2016.01)
*H02J 5/00* (2016.01)
(Continued)

(52) U.S. Cl.
CPC ............. *H02J 50/12* (2016.02); *B60L 11/14* (2013.01); *B60L 11/182* (2013.01);
(Continued)

(58) Field of Classification Search
CPC ...................................................... H02J 5/005
See application file for complete search history.

(56) References Cited

U.S. PATENT DOCUMENTS

2007/0096691 A1  5/2007  Duncan et al.
2008/0186131 A1  8/2008  Hanai et al.
(Continued)

FOREIGN PATENT DOCUMENTS

JP  2006153747 A  6/2006
JP  2007528186 A  10/2007
(Continued)

OTHER PUBLICATIONS

International Search Report and Written Opinion (in Japanese with English Translation) for PCT/JP2013/007305, dated Feb. 10, 2014; ISA/JP.

*Primary Examiner* — Jared Fureman
*Assistant Examiner* — James Evans
(74) *Attorney, Agent, or Firm* — Harness, Dickey & Pierce, P.L.C.

(57) ABSTRACT

A vehicular system mounted to a vehicle includes: a power-feeding device that wirelessly feeds power to a power-feeding object device; a communication device that performs wireless communication with a predetermined portable device; and a control device that controls to stop a power-feeding operation of the power-feeding device when the communication device performs wireless communication with the portable device.

5 Claims, 6 Drawing Sheets

(51) Int. Cl.
  *H02J 50/10* (2016.01)
  *H02J 50/80* (2016.01)
  *H02J 17/00* (2006.01)
  *H02J 7/02* (2016.01)
  *H04B 15/02* (2006.01)
  *B60L 11/14* (2006.01)
  *B60L 11/18* (2006.01)

(52) U.S. Cl.
  CPC ............ *B60L 11/1846* (2013.01); *H02J 5/005* (2013.01); *H02J 7/025* (2013.01); *H02J 17/00* (2013.01); *H02J 50/10* (2016.02); *H02J 50/80* (2016.02); *H04B 15/02* (2013.01); *B60L 2210/30* (2013.01); *B60L 2240/70* (2013.01); *Y02T 10/70* (2013.01); *Y02T 10/7005* (2013.01); *Y02T 10/7072* (2013.01); *Y02T 10/7077* (2013.01); *Y02T 10/7241* (2013.01); *Y02T 10/7291* (2013.01); *Y02T 90/121* (2013.01); *Y02T 90/122* (2013.01); *Y02T 90/127* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | |
|---|---|---|
| 2010/0007307 A1 | 1/2010 | Baarman et al. |
| 2011/0043327 A1* | 2/2011 | Baarman ................ H02J 5/005 340/5.8 |
| 2011/0213983 A1* | 9/2011 | Staugaitis ........... B60L 11/1824 713/176 |
| 2012/0153894 A1 | 6/2012 | Widmer |
| 2013/0307474 A1 | 11/2013 | Shimura et al. |

FOREIGN PATENT DOCUMENTS

| | | |
|---|---|---|
| JP | 2008190173 A | 8/2008 |
| JP | 2011527885 A | 11/2011 |
| WO | WO-2012105242 A1 | 8/2012 |

* cited by examiner

VEHICULAR SYSTEM, COMMUNICATION APPARATUS, POWER-FEEDING DEVICE, AND NON-TRANSITORY TANGIBLE COMPUTER-READABLE STORAGE MEDIUM

CROSS REFERENCE TO RELATED APPLICATIONS

This application is a U.S. National Phase Application under 35 U.S.C. 371 of International Application No. PCT/JP2013/007305 filed on Dec. 12, 2013 and published in Japanese as WO 2014/118853 A1 on Aug. 7, 2014. This application is based on and claims the benefit of priority from Japanese Patent Application No. 2013-17077 filed on Jan. 31, 2013. The entire disclosures of all of the above applications are incorporated herein by reference.

TECHNICAL FIELD

The present disclosure relates to a vehicular system mounted to a vehicle that performs wireless communication and inductive power feeding.

BACKGROUND ART

Recently, many inductive power-feeding devices such as a wireless charger for supplying power wirelessly to a mobile phone or a smartphone with a battery have been proposed (for example, see Patent Document 1). The use of an inductive power feeder differs from the use of a conventional power-feeding method in which a cable is connected to a power-feeding object device such as a mobile phone, and there is no need to connect a cable to a wall socket or a power-feeding object device in a case of using an inductive power-feeding device.

Recently, verification systems have been used to start an engine or perform locking and unlocking of a door without using a mechanical key in a vehicle, and wireless communication is performed between a portable device, which is carried by a user, and a vehicular device.

In addition, it has been proposed that a wireless charger is applied to a vehicle (see Patent Document 3).

PRIOR ART LITERATURES

Patent Literature

Patent Document 1: JP 2011-527885 A
Patent Document 2: JP 2008-190173 A
Patent Document 3: US 2012/0153894

SUMMARY OF THE INVENTION

For an inductive power-feeding device such as a wireless charger, the configuration such as an electromagnetic induction system or a magnetic field resonance system has been proposed to put into use. However, both of the systems emit an electromagnetic wave and generate noise that interfere wireless communication around a power-feeding device. Although it is desired to wirelessly feed power to a power-feeding object device in a vehicle, there are many devices crowded around a driver's seat in a vehicle. Thus, it is possible that wireless communication is interfered by the power-feeding device.

The present disclosure proposes to provide a vehicular system, a communication device, a power-feeding device and a program that can inhibit the interference of communication.

A vehicular system according to a first aspect of the present disclosure is mounted to a vehicle, and includes a power-feeding device, a communication device and a control device.

The power-feeding device feeds power wirelessly to a power-feeding object device. The communication device performs wireless communication with a predetermined portable device. Additionally, the control device stops a power-feeding operation performed by the power-feeding device when the communication device performs wireless communication with the portable device.

The vehicular system configured as above can inhibit the interference to wireless communication caused by noise generated by the power-feeding operation since the power-feeding operation performed by the power-feeding device is stopped when the communication device performs wireless communication with the portable device.

It is noted that the power-feeding object device is not particularly restricted to a device to which power is supplied from the power-feeding device. The power-feeding object device can be applied to a variety of devices. For example, the power-feeding object device may be a device that includes a battery for charging power provided from the power-feeding device, or the power-feeding object device may be a device operated by the supplied power while power is supplied from the power-feeding device.

A communication apparatus according to a second aspect of the present disclosure is mounted to a vehicle, and includes: a communication device for performing wireless communication with a predetermined portable device; and a control device. The control device transmits a control signal to stop a power-feeding operation performed by a power-feeding device, which feeds power wirelessly to a power-feeding object device.

The communication apparatus configured above can inhibit wireless communication being interfered by noise generated by a power-feeding operation since the power-feeding operation performed by the power-feeding device is stopped while the communication device performs wireless communication with a portable device.

A power-feeding device according to a third aspect of the present disclosure feeds power wirelessly to a power-feeding object device. The power-feeding object device stops a power-feeding operation in response to a predetermined control signal received from a communication device communicating with the power-feeding device, and starts the power-feeding operation subsequent to a predetermined time period, which has elapsed from stopping transmission of the control signal from the communication device.

Since the power-feeding device configured above does not start an power-feeding operation until a predetermined time period has elapsed from stopping transmission of a control signal, the power-feeding operation continues to be stopped without resuming the power-feeding operation when the power-feeding device receives a control signal again prior to the predetermined time period has elapsed.

Accordingly, it can be inhibited that the initiation and termination of a power-feeding operation are repeated within a short time interval. In particular, for notifying a user of the initiation of power feeding, a user may be annoyed by the repetition of the initiation and termination of the power-feeding operation and the repetition of the above operation when it is configured to perform an operation such as light emission or oscillation at the time of the power-feeding object device initiating power feeding. However, the power-feeding device configured above may inhibit the generation of the above operation.

A program according to a fourth aspect of the present disclosure is a gram executed by a computer system including a communication device for performing wireless communication with a portable device. The program controls the computer system to function as a control device for transmitting a control signal for stopping a power-feeding operation performed by a power-feeding device, which feeds power wirelessly to a power-feeding object device.

The computer system controlled by such program generates the functions and effects similar to the communication device according to the second aspect.

It is noted that the above program includes a sequence of instructions in order applied to processing performed by a computer. The program is stored in ROM, RAM or the like incorporated into the computer, and the program may be used by loading to the computer from the ROM, RAM or the like to be used. Additionally, the program may be loaded to the computer through a variety of recording medium devices or communication cables and be used.

An optical disk such as CD-ROM or DVD-ROM, a magnetic disk and a semiconductor memory may be used as a recording medium.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
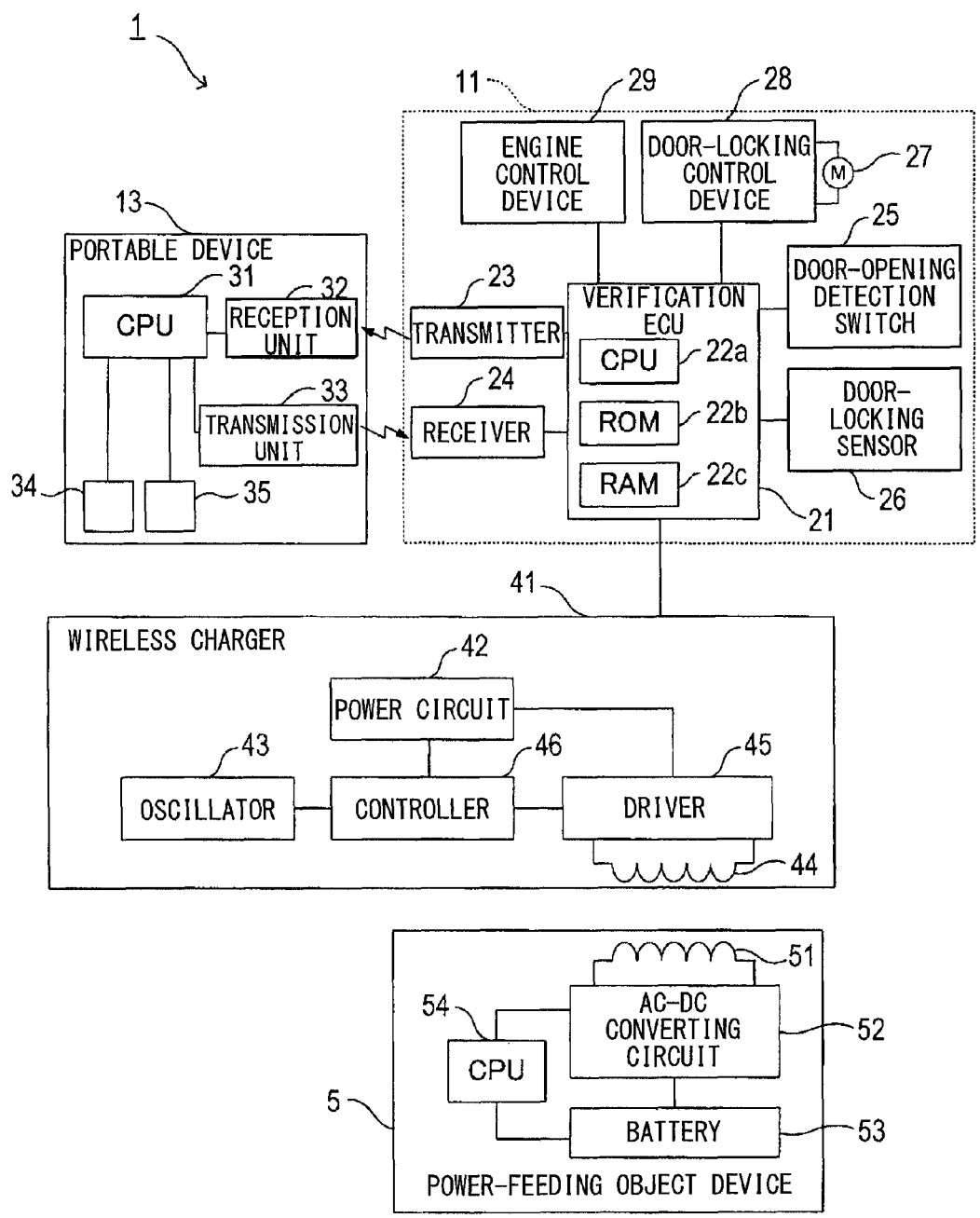
FIG. 1 is a block diagram that shows a configuration of a vehicular system according to a first embodiment of the present disclosure.

The following describes embodiments of the present disclosure with reference to the drawings.

First Embodiment (1) The Entire Configuration

A vehicular system 1 according to the present embodiment is a system that includes a communication device 11 and a wireless charger 41, which are mounted to a vehicle, and a portable device 13. The system includes a wireless verification function (that is, a smart entry start system), which starts an engine and performs unlocking/locking of a door without using a mechanical key, and a contactless charging function for feeding power to a portable power-feeding object device 5 without making contact to charge a battery. The following describes the configuration elements for executing a variety of functions.

(1-1) Wireless Verification

The communication device 11 includes a verification ECU 21. The verification ECU 21 is mainly configured by a well-known micro-computer that includes a CPU 22a, which controls the function of the verification ECU 21, a ROM 22b, a RAM 22c, and a bus line connecting an input/output interface (not shown) and these above-mentioned components. The CPU 22a performs operation control as a wireless communication system in response to, for example, an application program read by the ROM 22b. It is noted that the verification ECU 21 also executes the operation control of the after-mentioned wireless charger 41.

The verification ECU 21 connects: a transmitter 23 that transmits a transmission request signal to a predetermined detection area inside and outside of a vehicle; a receiver 24 that receives a signal transmitted wirelessly from the portable device 13; a door-opening detection switch 25 that detects the opening/closing states of a door; a door-locking sensor 26 that detects the locking/unlocking states of the door; a door-locking control device 28 that controls the driving of a door-locking motor 27 to lock and unlock the door of the vehicle; and an engine control device 29 that controls to start and stop an engine of the vehicle.

The transmitter 23 transmits predetermined data with an LF band radio wave (for example, a radio wave around 134 kHz) designated as a carrier wave, which is FM-modulated or AM-modulated. In addition, the receiver 24 is configured to receive a UHF band radio wave within a predetermined range.

It is noted that, with regard to the vehicular system 1, the door-opening switch 25, the door-locking sensor 26, and the door-locking motor 27 are arranged at each door. In the present embodiment, the detection area in which the transmitter 23 transmits a transmission request signal is within a range of, for example, a fixed distance (i.e., 70 cm) from a door handle arranged at the outer side of a driver seat door.

On the other hand, the portable device 13 includes: a CPU 31 that executes the function of the portable device 13; a reception unit 32 that receives a variety of request signals transmitted from the transmitter 23 at a predetermined transmission frequency through a reception antenna (not shown) and controls data contained in the request signal to be inputted into the CPU 31; and a transmission unit 33 that controls a wireless signal including data to be outputted from the CPU 31 to transmit from a transmission antenna (not shown).

The portable device 13 includes: a locking button 34 to be pressed when locking a door of the vehicle; and an unlocking bottom 35 to be pressed when unlocking the door of the vehicle.

The transmission unit 33 transmits predetermined data by performing FM-modulation or AM-modulation of a radio wave in which a predetermined response frequency is designated as a carrier wave. For example, a radio wave in the range of 300 to 400 MHz (i.e., a RF band) within a UHF band is configured as the response frequency of the transmission unit 33.

With regard to the vehicular system 1 as configured above, the communication device 11 and the portable device 13 perform wireless verification control that detects the existence of the portable device 13 within the detection area and to allow door locking/unlocking or engine starting. The wireless verification control is executed every fixed time period or whenever a predetermined event such as door opening/closing happens.

With regard to a smart entry and start system, an electronic key (i.e., the portable device 13) is registered for each vehicle, and locking and unlocking the door cannot be operated without the registered key. Thus, the communication device 1 operates communication for determining whether an electronic key is registered by the portable device 13. The following describes a series of communication processing as smart communication.

It is noted that the verification ECU 21 reattempts smart communication up to a predetermined maximum number of times when the smart communication is not successful (i.e., in a case where a proper response is not attained from the portable device 13).

The verification ECU 21 performs remote-keyless-entry control to lock/unlock the door when a user presses the locking button 34 or the unlocking button 35 of the portable device 13.

(1-2) Inductive Charging

A wireless charger 41 is arranged inside the vehicle. The wireless charger 41 includes a mounting region (not shown) for mounting the power-feeding object device 5. Charging a battery 53 embedded in the power-feeding object device 5 can be performed by placing the power-feeding object device 5 on the mounting region.

The wireless charger 41 includes: a power circuit 42 that feeds direct current provided from a vehicular battery (not shown) mounted to the vehicle; an oscillator 43 that oscillates at a predetermined frequency; a power transmission coil 44 that serves as a coil at the power transmission side; and a driver 45 that provides AC power to the power transmission coil 44.

The wireless charger 41 converts DC power provided from the power circuit 42 to AC power based on an oscillation frequency signal from the oscillator 43, and provides the AC power to the power transmission coil 44 through the driver 45. Additionally, the wireless charger 41 includes a controller 46 for controlling the wireless charger 41.

The controller 46 connects the verification ECU 21, and receives a control signal from the verification ECU 21 to control temporary stop and resumption of a power-feeding operation.

The power-feeding object device 5 includes: a power-receiving coil 51 that serves as a coil at the power receiving side; an AC-DC converting circuit 52; and a CPU 54 that controls charging processing performed by the power-feeding object device 5. The AC-DC converting circuit 52 rectifies AC power received from the power-transmission coil 44 of the wireless charger 41 through the power-receiving coil 51 to DC power, and then converts the DC power to DC power having a predetermined potential so as to feed the DC power to the battery 53 as a secondary battery.

An ordinary component can be used as the power-transmission coil 44 at the power transmission side and the power-receiving coil 51 at the power receiving side for achieving inductive charging through, for example, an electromagnetic induction system or a magnetic field resonance system.

Next, the following describes the power-feeding operation of the wireless charger 41.

The controller 46 of the wireless charger 41 monitors state change of a magnetic field of the power-transmission coil 44 by, for example, intermittent driving. When the power-feeding object device 5 mounts on the mounting region of the wireless charger 41, the state of the magnetic field of the power-transmission coil 44 is changed when the power-transmission coil 44 arranged at the wireless charger 41 and the power-receiving coil 51 arranged at the power-feeding object device 5 are in proximity. The controller 46 determines that the power-feeding object device 5 mounts on the mounting region based on a change in the magnetic field.

The CPU 54 of the power-feeding object device 5 monitors the state change of the magnetic field of the power-receiving coil 51, and determines that the power-feeding object device 5 mounts on the mounting region when the potential value corresponding to the state change of the magnetic field of the power-receiving coil 51 reaches a predetermined potential value.

The controller 46 of the wireless charger 41 and the CPU 54 of the power-feeding object device 5 perform the exchange of verification information for mutually verifying opposite parties through the power-transmission coil 44 and the power-receiving coil 51 when the power-transmission coil 44 and the power-receiving coil 51 are in proximity. When the verification is complete, the controller 46 of the wireless charger 41 performs the power-feeding operation in which DC power from the power circuit 42 is supplied as AC power with a predetermined frequency based on an oscillation frequency signal from the oscillator 43 to the power-transmission coil 44 through the driver 45.

At the side of the power-feeding object device 5, AC power is induced at the power-receiving coil 51 by the AC power from the power-transmission coil 44 of the wireless charger 41. The induced AC power is converted to DC power through rectification at the AC-DC converting circuit 52, and then the DC power is supplied to the battery 53. Accordingly, the battery 53 can be charged.

The controller 46 connects the verification ECU 21. A Dis signal, which is indicative of either a high-level (Hi) signal having a higher potential or a low-level (Lo) signal having a lower potential, is outputted as a control signal to the controller 46 from the verification ECU 21. In the following section, the Dis signal is described as "ON" in a case of the Hi signal, and the Dis signal is described as "OFF" in a case of the Lo signal.

The controller 46 performs the power-feeding operation on the condition that the power-feeding object device 5 mounts on the mounting region in a case of the Dis signal in an OFF state. On the other hand, when the Dis signal is switched to an ON state, then the power-feeding operation is stopped temporarily. That is, the Dis signal, which is at a high level, is an example of a control signal that stops the power-feeding operation of the power-feeding device.

Figure 2:
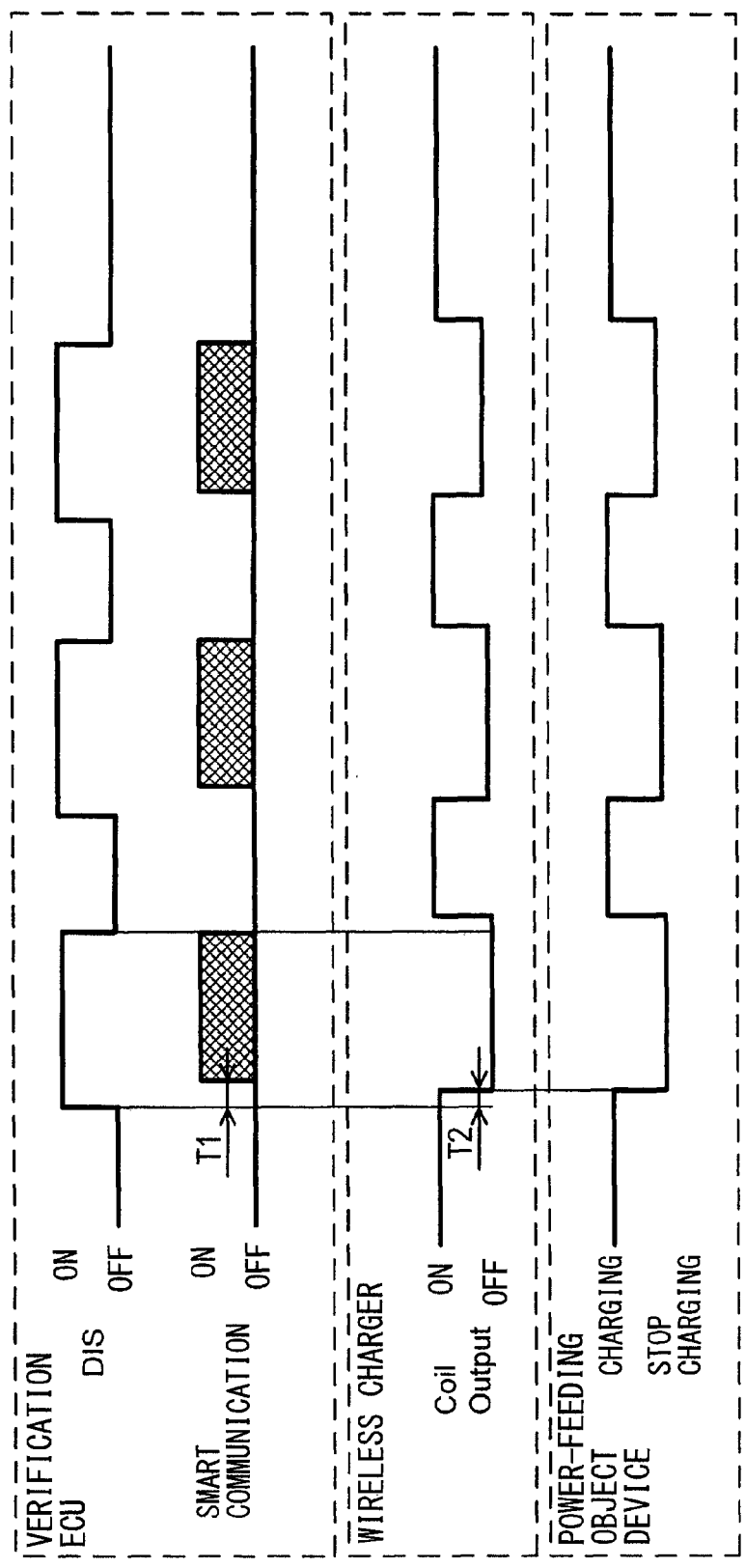
FIG. 2 is a chart that shows the operation timings of a verification ECU, a wireless charger and a power-feeding object device according to the first embodiment.

(2) The Control at the Time of Power Feeding of the Vehicular System in the Present Embodiment The communication interference avoidance control executed by the CPU 22a of the verification ECU 21 is described with reference to FIG. 2. FIG. 2 is a diagram that illustrates smart communication executed three times; in other words, the smart communication fails twice and is successful at the third attempt. The smart communication is performed once if the smart communication is successful at the first attempt; however, the smart communication is performed up to a predetermined maximum number of times if the communication is not successful at the third attempt.

The CPU 22a switches the Dis signal to an OFF state prior to the smart communication. The wireless charger 41 receives the signal to stop the power-feeding operation (i.e., switch Coil Output to an OFF state). The wireless charger 41 starts or stops the power-feeding operation slightly later than the Dis signal.

In FIG. 2, T1 is a time period that has been elapsed from the time of switching the Dis signal to an ON state to the time of starting the smart communication; and T2 is a time period elapsed from the time of switching the Dis signal to an ON state to the time of the wireless charger 41 stopping the power-feeding operation. In the present embodiment, T1 and T2 are configured so as to make T1>T2.

The CPU 22a switches the Dis signal to an OFF state that coordinates with the timing where the smart communication is complete. The wireless charger 41 receives the signal to resume the power-feeding operation.

Figure 3:
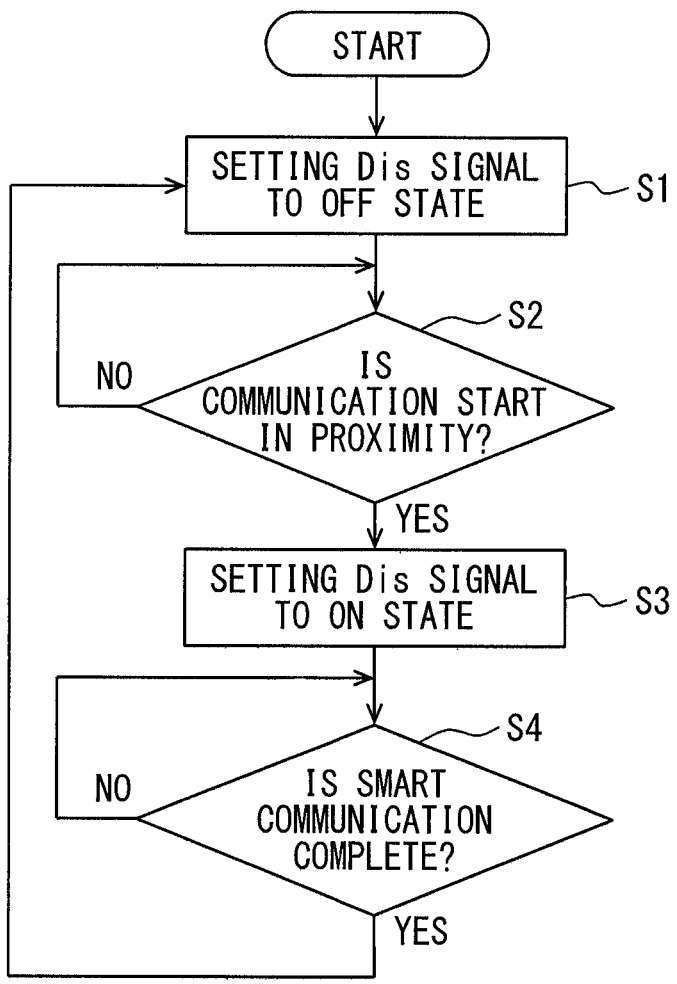
FIG. 3 is a flowchart that shows a processing procedure of communication interference avoidance control according to the first embodiment.

The particular processing of the communication interference avoidance control executed by the CPU 22a is illustrated based on the flowchart in FIG. 3. This processing is initiated when the controller 46 of the wireless charger 41 determines that the power-feeding object device 5 mounts on the mounting region and a signal corresponding to this situation is transmitted to the CPU 22a of the verification ECU 21. In addition, when the power-feeding object device 5 is removed from the mounting region or when the wireless charger 41 completes the charging once the charging is complete, the processing continues to be executed until the signal corresponding to either situation is transmitted to the CPU 22a.

In the present processing, the Dis signal is initially set to an OFF state (in S1).

Next, the present processing checks whether the starting time of the smart communication approaches to the predetermined time (in S2). When the start of the smart communication is not in proximity (S2: NO), S2 is repeated again. That is, the present processing is in an idle state until the start of the smart communication is in proximity.

When the start of the smart communication approaches to the predetermined time (S2: YES), the Dis signal is switched to an ON state (in S3). Accordingly, the power-feeding operation of the wireless charger 41 is stopped.

Next, it is determined whether the smart communication is complete (in S4). When the smart communication is not complete (S4: NO), S4 is repeated again, and the present processing is in an idle state until the smart communication is complete. The processing returns to S1 when the smart communication is complete (S4: YES).

(3) Effect

The vehicular system 1 configured above easily avoid the interference of the smart communication caused by noise generated by the power-feeding operation of the wireless charger 41 since the vehicular system 1 stops the power-feeding operation of the wireless charger 41 when the communication device 11 performs the smart communication with the portable device 13.

Second Embodiment

The configuration of a vehicular system according to a second embodiment is basically identical to the one in the first embodiment. However, a part of the operation of the wireless charger is different, and the following mainly describes the part different from the first embodiment.

Figure 4:
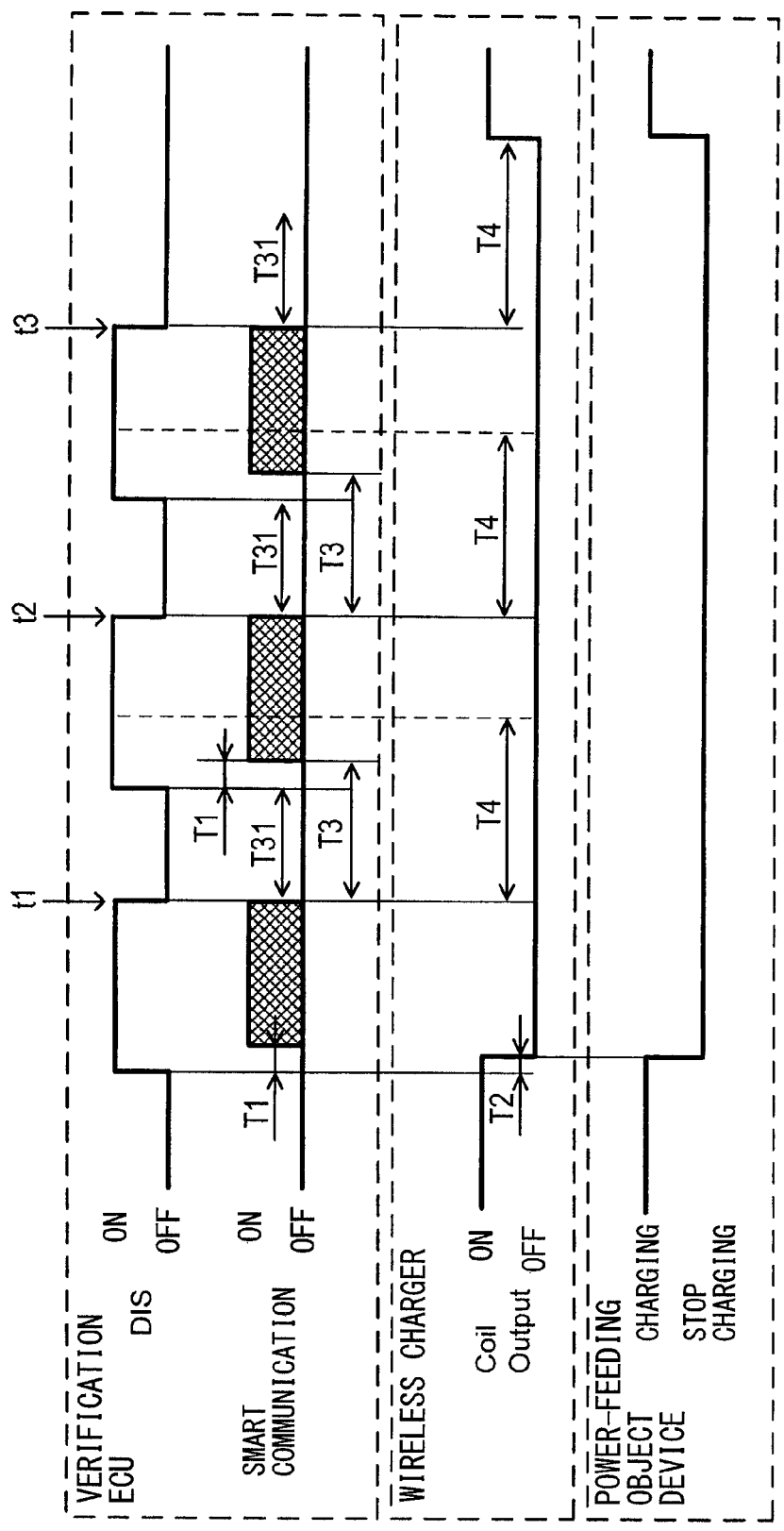
FIG. 4 is a chart that shows the operation timings of a verification ECU, wireless charger and a power-feeding object device according to a second embodiment of the present disclosure.

In the present embodiment, as shown in FIG. 4, the wireless charger 41 resumes the power-feeding operation after a predetermined time period T4 as the charge starting mask time has elapsed since the Dis signal, which is transmitted from the verification ECU 21, is switched from an ON state to an OFF state (i.e., since the transmission of a control signal to stop the power-feeding operation has stopped). In addition, when the Dis signal is switched to an ON state before the predetermined time period T4 has elapsed after the Dis signal is switched to an OFF state, the wireless charger 41 continues to be in a starting state without resuming the power-feeding operation.

In FIG. 4, T3 is a time interval when a reattempt is carried out without having a success of the smart communication. T31 is the time expressed by T31=T3−T1, and T4 is configured such that T4>T31. The Dis signal is in an OFF state when the smart communication is complete at the first attempt and the second attempt (at t1, t2); however, the power-feeding operation does not resume since the Dis signal is in an ON state prior to T4, which has elapsed from t1 and t2. The power-feeding operation is resumed subsequent to T4, which has elapsed since the Dis signal is not switched to an ON state at the time of completing smart communication at the third attempt (at t3).

When the wireless charger 41 configured above reattempts the smart communication after a failure, the wireless charger 41 continues not to perform the power-feeding operation until the smart communication is either completed or reattempted up to a maximum number of times, without resuming the power-feeding operation until the next smart communication is initiated.

Accordingly, the power-feeding object device 5 can inhibit the repetition of starting and stopping the power-feeding operation in a short time interval. In particular, when the power-feeding object device 5 performs an operation such as emitting light or oscillation at the time of receiving power from the wireless charger 41 and initiating charging, a user feels annoyed since light emitting or oscillation is repeated when the initiation and termination of charging are repeated. However, the wireless charger configured above reduces the number of such operation so that the user does not feel annoyed.

Third Embodiment

The configuration of a vehicular system according to a third embodiment is basically identical to the one in the first embodiment. However, there is a different part with regard to the control executed by the CPU 22a of the verification ECU 21. The following mainly describes the part different from the first embodiment.

Figure 5:
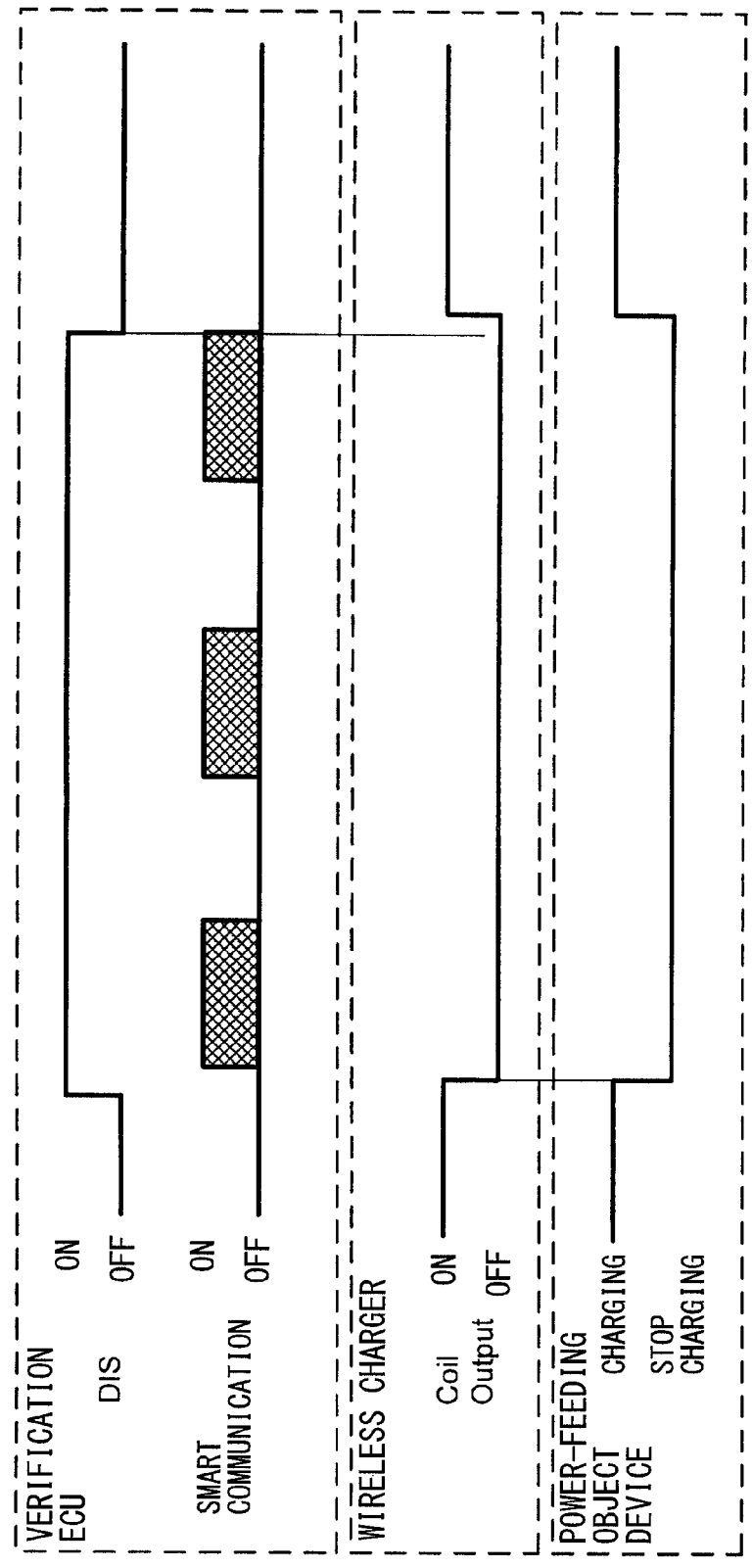
FIG. 5 is a chart that shows the operation timings of a verification ECU, a wireless charger and a power-feeding object device a third embodiment of the present disclosure.

(1) The Control at the Time of Power Feeding in a Vehicular System According to the Present Embodiment The communication interference avoidance control executed by the CPU 22a of the verification ECU 21 is described with reference to FIG. 5.

The CPU 22a switches the Dis signal to an ON state before performing smart communication. Subsequently, the Dis signal is switched to an OFF state after the smart communication is successful. FIG. 5 illustrates that the smart communication is successful at the third attempt, and the Dis signal is switched to an OFF state after the smart communication performed at the third attempt. Similar to the first embodiment, the wireless charger 41 resumes the power-feeding operation when the Dis signal is switched to an OFF state.

Figure 6:
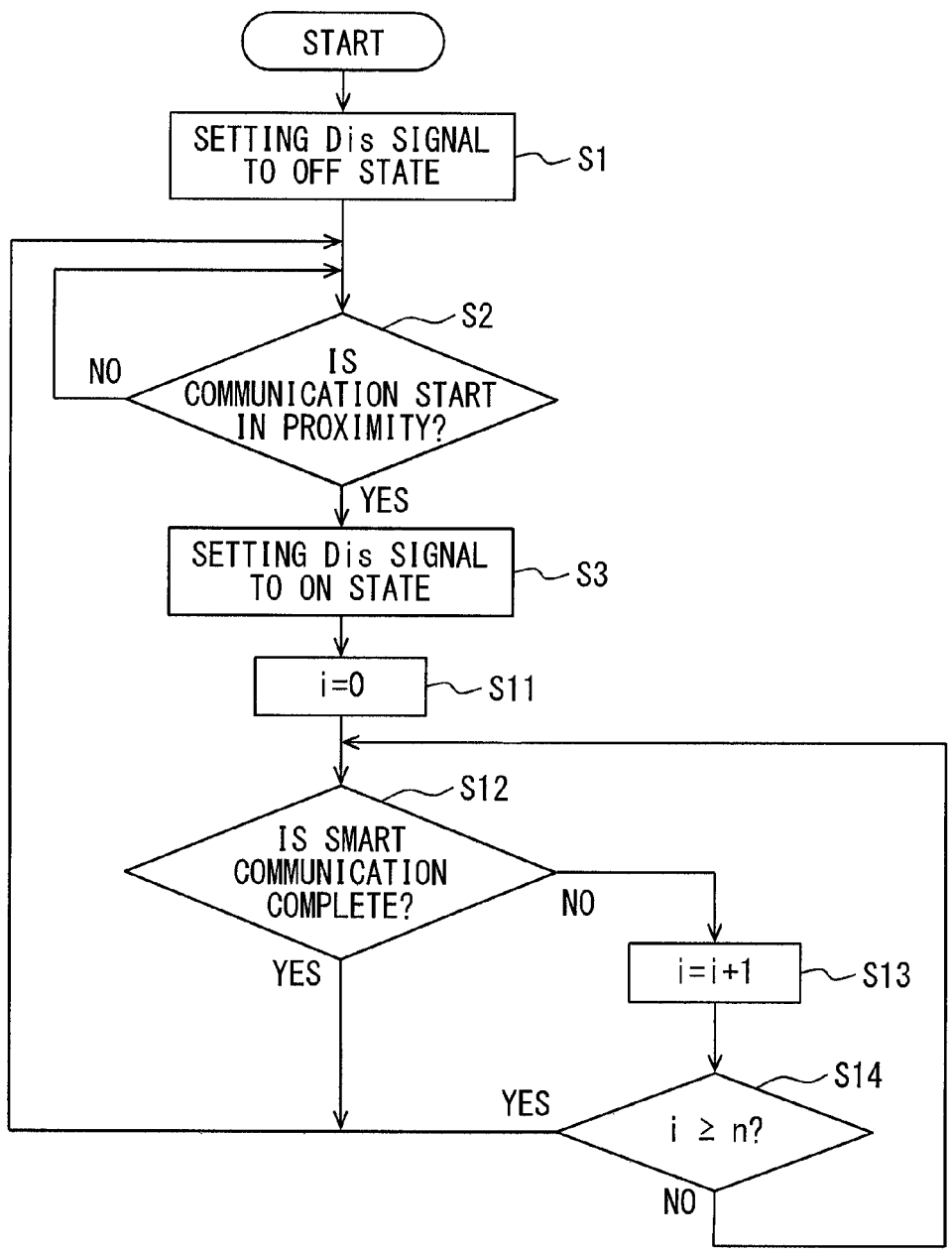
FIG. 6 is a flowchart that shows a processing procedure of communication interference avoidance control according to the third embodiment.

The particular processing of the communication interference avoidance control executed by the CPU 22a is described with reference to the flowchart in FIG. 6. The conditions of initiating and terminating the present processing are similar to the one in the first embodiment. The parts identical to the parts of processing in FIG. 3 are designated with the same reference numerals and a detailed description thereof is omitted herein.

In the present processing, a variable i is set to 0 after the Dis signal is set to an ON state at S3 (in S11). Next, it is determined whether the smart communication is successful (in S12). When the smart communication is successful (S12: YES), the processing returns to S1. When the smart communication is not successful (S12: NO), the variable i is incremented to i=i+1 (in S13).

Next, it is determined whether the variable i is larger than or equal to a predetermined threshold value n (in S14). The threshold value n is a maximum number of times of reattempting the smart communication. Accordingly, when the variable i is larger than or equal to n, the number of times of reattempting the smart communication reaches the maximum number. When the variable i is larger than or equal to the threshold value n (S14: YES), the processing returns to S1. When the variable i is not larger than or equal to the threshold value n (S14: NO), the processing returns to S12.

(2) Effect

With regard to the vehicular system as configured above, when the verification ECU 21 reattempts the smart communication after a failure, the Dis signal is not switched to an OFF state until the smart communication is either successful or repetitively performed up to the maximum number of times. In other words, the wireless charger 41 continues not to perform the power-feeding operation until the smart communication is either successful or repetitively performed up to the maximum number of times.

Accordingly, as similar to the second embodiment, the present embodiment can inhibit the repetition of the power-feeding object device 5 starting and stopping the power-feeding operation in a short time interval. In addition, the present embodiment can also inhibit the repetition of light emitting or oscillation in response to the initiation and termination of charging when an operation such as light emitting or oscillation is performed while the power-feeding object device 5 initiates charging.

Modification

The embodiments of the present disclosure are described above. However, the present disclosure is not restricted to any of embodiments. A variety of modes can be applied as long as pertaining to the technical scope of the present disclosure.

For example, the above embodiments exemplify the configuration in which the Dis signal is switched to an ON state earlier than the starting time of the smart communication so as to stop the power-feeding operation of the wireless charger sufficiently earlier than starting the smart communication. However, it can be configured that the smart communication starts earlier than stopping the power-feeding operation. In addition, it may be configured that the smart communication is complete at the timing of starting the power-feeding operation. It is noted that the communication interference can be surely inhibited by increasing the ratio of the period of stopping the power-feeding operation to the period of executing the smart communication.

In addition, the above embodiments exemplify the configuration in which the wireless charger 41 feeds power to the power-feeding object device 5 for charging the battery 53; however, the power-object object device 5 is not restricted to the configuration for charging. The power-feeding object device 5 may be a device operating with receiving inductive power feeding, or a light.

What is claimed is:

1. A vehicular system mounted to a vehicle, comprising:
   a power-feeding device that feeds power wirelessly to a power-feeding object device;
   a communication device that performs wireless communication with a predetermined portable device; and
   a control device that transmits a control signal, which controls a power-feeding operation performed by the power-feeding device to stop when the communication device performs the wireless communication with the portable device;
   wherein the power-feeding device initiates the power-feeding operation subsequent to a predetermined time period, which has elapsed from stopping transmission of the control signal from the control device;
   wherein the power-feeding device continues to stop the power-feeding operation when the transmission of the control signal is restarted prior to an elapse of the predetermined time period;
   wherein the communication device reattempts the wireless communication up to a predetermined maximum number of times when the wireless communication with the portable device is not successful;
   wherein the control device stops the transmission of the control signal when the wireless communication is completed; and
   wherein the control device restarts the transmission of the control signal prior to the elapse of the predetermined period from the stopping transmission of the control signal when the wireless communication is reattempted.

2. The vehicular system according to claim 1,
   wherein the control device stops the transmission of the control signal after the wireless communication is successful or reattempt reaches the predetermined maximum number of times.

3. A communication apparatus mounted to a vehicle, comprising:
   a communication device that performs wireless communication with a predetermined portable device; and
   a control device that transmits a control signal to stop a power-feeding operation performed by a power-feeding device, which feeds power wirelessly to a power-feeding object device, when the communication device performs the wireless communication with the portable device;
   wherein the power-feeding device initiates the power-feeding operation subsequent to a predetermined time period, which has elapsed from stopping transmission of the control signal from the control device;
   wherein the power-feeding device continues to stop the power-feeding operation when the transmission of the control signal is restarted prior to an elapse of the predetermined time period;
   wherein the communication device reattempts the wireless communication up to a predetermined maximum number of times when the wireless communication with the portable device is not successful;
   wherein the control device stops the transmission of the control signal when the wireless communication is completed; and wherein the control device restarts the transmission of the control signal prior to the elapse of the predetermined period from the stopping transmission of the control signal when the wireless communication is reattempted.

4. A power-feeding device for feeding power wirelessly to a power-feeding object device,
wherein the power-feeding device stops a power-feeding operation in response to a predetermined control signal received from a communication apparatus for communicating with the power-feeding device, and starts the power-feeding operation subsequent to a predetermined time period, which has elapsed from stopping transmission of the control signal from the communication apparatus;
wherein the power-feeding device continues to stop the power-feeding operation when the transmission of the control signal is restarted prior to an elapse of the predetermined time period;
wherein the communication apparatus reattempts the wireless communication up to a predetermined maximum number of times when the wireless communication is not successful;
wherein the communication apparatus stops the transmission of the control signal when the wireless communication is completed; and
wherein the communication apparatus restarts the transmission of the control signal prior to the elapse of the predetermined period from the stopping transmission of the control signal when the wireless communication is reattempted.

5. A non-transitory tangible computer-readable storage medium comprising instructions for execution by a computer, the instructions including a method being computer implemented, the method including:
feeding power wirelessly to a power-feeding object device;
performing wireless communication with a portable device;
transmitting a control signal to stop the feeding of power wirelessly to the power-feeding object device when performing the wireless communication with the portable device;
initiating a power-feeding operation subsequent to a predetermined time period, which has elapsed from stopping transmission of the control signal;
continuing to stop the power-feeding operation when restarting the transmission of the control signal prior to an elapse of the predetermined time period;
reattempting the wireless transmission up to a predetermined maximum number of times when the wireless communication with the portable device is not successful;
stopping the transmission of the control signal when the wireless communication is completed; and
restarting the transmission of the control signal prior to the elapse of the predetermined time period from the stopping transmission of the control signal when the wireless communication is reattempted.

* * * * *